United States Patent Office 3,265,790
Patented August 9, 1966

3,265,790
METHOD FOR FORMING BIAXIALLY
ORIENTED FILM
Charles C. Kirk, Laurel, and Razmic S. Gregorian, Silver Spring, Md., assignors to W. R. Grace & Co., a corporation of Connecticut
No Drawing. Filed Jan. 31, 1963, Ser. No. 255,207
6 Claims. (Cl. 264—95)

This invention relates to a method for forming film. More particularly this invention is directed to a method of forming biaxially oriented heat shrinkable polyolefin film which has not been previously crosslinked by irradiation or chemical treatment.

It is known in the art to form biaxially oriented heat shrinkable polyolefin films such as polyethylene and polypropylene film by various methods. One method is to cold roll the polymer in film form. This method has the drawback of requiring expensive calendering equipment.

Other methods of forming biaxially oriented polyolefin film include hot calendering or blowing of the film at temperatures near the crystalline melting point of the polymer. Although both the crystalline region and amorphous region are oriented by this method thus imparting sufficient heat shrinkability to the film, for most polymers, e.g., high density polyethylene, it is necessary to crosslink the film prior to orientation in order to overcome the high degree of control of temperature, roll speeds, etc., required to produce uncrosslinked biaxially oriented heat shrinkable film on a continuous basis. The commercial processability crosslinking adds to biaxially oriented polyolefin film has the drawback that the additional step of crosslinking the polymer film by irradiation or by chemical means, e.g., organic peroxide crosslinking agents, is costly and time consuming. Thus there has been a long felt want of a method to produce uncrosslinked biaxially oriented film which is readily processable on a commercial basis and which has sufficient elastic memory to meet the heat shrinkable standards of commercial acceptability.

One object of this invention is to produce biaxially oriented heat shrinkable polyolefin film which has not been subjected to crosslinking by irradiation or chemical treatment. Other objects will appear from a reading hereinafter.

Summarily a heat shrinkable polyolefin film which has not been subjected to crosslinking is produced by expanding said film under pressure at a temperature within 10° C. below and 20° C. above its melting point while said film is juxtaposed to a guide or restraining layer of material easily biaxially oriented and which shrinks at a lower temperature than the desired polyolefin film product, thereby biaxially orienting the polyolefin film product. After releasing the pressure and cooling the thus oriented polyolefin film below its melting point, the oriented polyolefin film can be shrunk by reheating the film above its melting point.

Any rubber or plastic material which is readily biaxially oriented and which can be heat shrunk at a lower temperature than the uncrosslinked biaxially oriented polyolefin film product is operable as the juxtaposed layer material in this invention. Thus, some of the combinations operable in performing this invention include but are not limited to the following:

| Polyolefin to be Oriented | Juxtaposed Layer Material |
| --- | --- |
| High density polyethylene | Polystyrene. |
| Do | Vulcanized rubber (natural or synthetic). |
| Do | Crosslinked low density polyethylene. |
| Low density polyethylene | Polystyrene. |
| Do | Vulcanized rubber (natural or synthetic). |
| Polypropylene | Vulcanized rubber (natural or synthetic). |
| Do | Crosslinked low density polyethylene. |
| Do | Crosslinked high density polyethylene. |

In the orientation step, it is preferred that the juxtaposed layer material be situated between the pressure source, e.g., air, and the polyolefin film to be oriented, thereby acting as a guide layer. This is especially true of rubber or any other material which has an almost instantaneous snapback to its original dimensions at or below the orientation temperature on release of pressure. Such placement facilitates the separation of the juxtaposed layer material and the desired oriented polyolefin film product. However, the invention has also been found to be operable as will be shown hereinafter if the juxtaposed layer acts as a restraining layer, with the polyolefin to be oriented adjacent the pressure source, the only drawback being that the blown oriented polyolefin film is collapsed in a wrinkled state as the juxtaposed layer snaps back to its original state on release of pressure. Thus in this invention in the blowing step to impart orientation, when the juxtaposed layer is situated adjacent the pressure source it will be called a guide layer and when the uncrosslinked polyolefin to be oriented is placed adjacent the pressure source, the juxtaposed layer will be termed a restraining layer.

It has been found that it is not necessary that the juxtaposed layer be in contact with the polyolefin film being oriented in order for the invention to be operable. The invention is not only workable but it is sometimes preferred that an air gap be present between the polymer to be oriented and the juxtaposed layer of guiding or restraining material.

It has also been found desirable, especially in the case where the juxtaposed layer is a crosslinked polyolefin, that separation of the oriented polyolefin film product and the juxtaposed layer is facilitated especially when no air gap therebetween is present, if prior to orientation a release agent is inserted between the polyolefin film to be oriented and the juxtaposed layer. Said release agents inhibit any tendency of the oriented polyolefin film product and the juxtaposed layer to stick together during the orientation step and after the pressure is released. Any fine particle material or oil or grease which is inert to the polyolefin to be oriented and the juxtaposed layer is operable as a release agent. Examples of operable release agents include, but are not limited to chalk, talcum powder, silicon oil, and the like. Other operable release agents would be obvious to one skilled in the art.

The biaxial orientation step is performed after preheating the polyolefin to be oriented to a temperature within a range of 10° C. below and 20° C. above the melting point of the polymer. In the case where a wholly amorphous polyolefin is being oriented, the orientation temperature is within a range of 10° C. below and 20° C. above its glass transition temperature. If desired, the juxtaposed restraining or guide layer can be heated simultaneously to approximately the same temperature range.

It is possible to perform the orientation step at temperatures higher than the upper limit of the aforementioned temperature, but optimum heat shrinking is obtained when the orientation is carried out at or near the melting point of the polymer being oriented.

The biaxial orientation step is performed by expanding the preheated polyolefin to be oriented and its juxtaposed guide or restraining layer of material with air pressure or any other gaseous medium which does not react with the polymer being oriented or its juxtaposed layer. The pieces, i.e. the film of the polyolefin to be oriented and the juxtaposed layer of the material, can be in contact with each other or an air gap can be provided therebetween. The width of the air gap can vary within wide limits depending upon the dimensions of the polyolefin being oriented. As a general rule the width of the air gap can be increased as the area dimensions of the polyolefin to be oriented increases.

The blown biaxially oriented polyolefin film after cooling below its melting point can be heat shrunk by reheating the film above its melting point. This latter procedure also provides a method of separation, where necessary, uncrosslinked biaxially oriented polyolefin film and the crosslinked juxtaposed layer of material which can be heat shrunk at a lower temperature. In the case where two pieces stick together it is only necessary to reheat the pieces to the temperature at which the juxtaposed layer of material heat shrinks to separate the pieces. After separation from the juxtaposed layer of material, the uncrosslinked biaxially oriented polymer film can be heat shrunk at its higher melting point.

The following examples will aid in explaining, but in no way limit the invention.

Throughout this invention the melt indices (MI) were measured under the conditions specified in ASTMD 1238-52T except for isotactic polypropylene, in which instance the procedure was modified so that the test was run at 230° C. instead of 190° C.

The density of the polyolefins was measured under the conditions specified in ASTMD 1505-57T.

Example 1

A 20 mil thick film of commercially available uncrosslinked polyethylene (melting point 105° C.) having a density of 0.92 (Alathon 14) was placed in contact with and juxtaposed to a guide layer consisting of a film of vulcanized butyl rubber (20 mils thick). The two film layers were heated to 100° C. and blown under air pressure until the polyethylene film had a thickness of 1.0 mil. On release of the air pressure, the rubber guide layer returned to its original dimensions. On reheating the uncrosslinked biaxially oriented polymer film to its melting point, the area of the film shrank 80%.

In a control run in the absence of a guide layer in the orientation step the preheated uncrosslinked polyethylene film burst on blowing.

Example 2

Example 1 was repeated with a 20 mil thick film of commercially available uncrosslinked linear polyethylene (melting point 137° C.) having a density of 0.96. After heating the polyethylene film to 132° C. the two layers were blown under air pressure until the polyethylene film had a thickness of 1.5 mils. On reheating the thus oriented polyethylene film to 137° C., the area of the film shrank 75%.

In a control run using the same procedure except that no guide layer was employed, the preheated uncrosslinked polyethylene film burst on blowing.

Example 3

Example 2 was repeated except that the film of vulcanized synthetic rubber was so positioned that it acted as a restraining layer instead of a guide layer. After cooling the blown film (1.5 mils thick) under pressure, the pressure was released allowing the rubber layer to snap back to its original dimensions thereby collapsing the biaxially oriented polyethylene in a wrinkled state.

Example 4

The procedure of Example 1 was utilized except that the film to be oriented was 20 mils thick commercially available uncrosslinked polyethylene (M.P. 137° C.) having a density of 0.96 and the guide layer of juxtaposed material consisted of crosslinked polyethylene (20 mils thick) having a density of 0.92 and a melting point of 110° C. An air gap of ¼ inch width was provided between the uncrosslinked and crosslinked films. After heating to 147° C., the film was blown until the film thickness was 1.0. After cooling, the uncrosslinked oriented polyethylene was reheated to 137° C. to effect an 80% reduction of the film area.

The following examples in Table I show various combinations of polyolefins to be oriented and juxtaposed material easily biaxially oriented and which shrinks at a lower temperature than the desired polyolefin film product. The procedure was as in Example 1 except where noted. In all examples, both the polymer to be oriented and the juxtaposed guide or restraining layer of material had an initial thickness of 20 mils prior to orientation. Unless otherwise specified the juxtaposed layer of material was used as a guide layer, i.e., between the pressure source and the polyolefin to be oriented.

TABLE I

| Example No. | Uncrosslinked Polyolefin to be Oriented | Juxtaposed Layer of Material | Air Gap between Layers (inches) | Orientation Temp. (° C.) | Thickness of Oriented Polyolefin (mils) | Remarks |
|---|---|---|---|---|---|---|
| 5 | Polypropylene [a] | Vulcanized synthetic rubber | 0 | 180 | 1.2 | |
| 6 | do | Crosslinked [c] Polyethylene | •0 | 165 | 6.1 | Juxtaposed material used as a restraining layer. |
| 7 | do | do | 0.5 | 166 | 0.5 | |
| 8 | do | Crosslinked [d] Polyethylene | 0 | 166 | 1.5 | Polypropylene and polyethylene layers adhered together. |
| 9 | do | do | 0.25 | 170 | 1.5 | |
| 10 | Polyethylene [b] | Crosslinked [c] Polyethylene | [f] 0 | 144 | 1.2 | |
| 11 | do | Vulcanized synthetic rubber | 0 | 132 | 5.0 | |
| 12 | do | do | 0 | 136 | 8.1 | |
| 13 | do | Crosslinked [c] Polyethylene | 1.0 | 133 | 0.5 | |
| 14 [g] | Polyethylene [b] | None | | 100 | | Film burst. |
| 15 [g] | Polyethylene [b] | do | | 133 | | Do. |
| 16 [g] | Polypropylene [a] | do | | 180 | | Do. |

[a] Commercially available polypropylene, density 0.89, melting point 170° C.
[b] Commercially available polyethylene, density 0.96, melting point 137° C.
[c] Crosslinked polyethylene, density 0.92, melting point 105° C.
[d] Crosslinked polyethylene, density 0.96, melting point 137° C.
[e] Talcum powder sprinkled between contacting film layers to preclude blown film from adhering to juxtaposed layer.
[f] Silicon oil spread on contacting film layers to preclude blown film from adhering to juxtaposed layer.
[g] Control run.
[h] Commercially available polyethylene, density 0.92, melting point 105° C.

Example 17

Example 1 was repeated except that the guide layer consisted of polystyrene film (20 mils thickness). The resulting biaxially oriented film had a thickness of 0.5 mil.

The following example shows a continuous method of forming uncrosslinked biaxially oriented film.

Example 18

Commercially available uncrosslinked linear polyethylene in pellet form having a density of 0.96 and a melting point of 137° C. was fed to the hopper of a 1 inch NRM Extruder machine equipped with a shallow screw and a pressure die mounted in a cross head so that extrusion takes place at an angle of about 90° with the axis of the extruder. The temperature in the extruder was maintained at 145–165° C. to convey the polymer therethrough in a molten state. The molten polymer exited the extruder through a 40 mil circular die (1″ diameter). Passing through the center portion of the die is a roller driven endless tube of expandable 1″ diameter vulcanized neoprene (20 mils thick). The endless tube of neoprene acted as a juxtaposed layer for the molten polymer exiting the die. After the molten polymer coated the outside of the endless neoprene tube, the tube and molten polymer were passed through two pairs of spaced nip rolls having trapped therebetween an air bubble causing the tube and molten polymer to expand, thus biaxially orienting the polymer. The positioning of the pairs of nip rolls was such that the temperature of the molten polymer was 135–145° C. on passage through the first pair of nip rolls and below the crystallization temperature on reaching the second pair of nip rolls. The distance between the two sets of nip rolls and the amount of expansion of the neoprene tubing can be varied to obtain the desired amount of biaxial orientation (expansion) of the polymer film being processed. Obviously the greater the expansion of the juxtaposed tube, the greater the orientation imparted to the polymer being processed. After passage through the second pair of nip rolls, the neoprene tube returned to its original dimensions and the biaxially oriented polyethylene film tubing was flattened in the expanded state. If desired, the nip rolls following the die exit can be chilled to insure that the oriented polymer is cooled below its crystallization temperature. The expanded biaxially oriented polyethylene film tubing was then slit on opposite sides to form two sheets of film in a horizontal plane. One sheet of polyethylene film was collected on a take up roll situated above the plane of operation and the other was collected on a take up roll position below the plane of operation. The endless neoprene tubing was conveyed in a horizontal plane via guide rollers around to the extruder die. The biaxially oriented polyethylene film product had a thickness of 1.5 mils.

Included within the scope of this invention is the addition of fillers, plasticizers, anti-oxidants, antistatic agents, dyes and pigments to the polyolefin to be oriented prior to the orientation step.

The oriented polyolefin film product has many and varied uses including the wrapping of food and other articles.

What is claimed is:

1. The method of biaxially orienting an uncrosslinked polyolefin film to form a heat shrinkable film which comprises heating said film at a temperature within 10° C. below and 20° C. above its melting point and thereafter expanding said film under gaseous pressure while said film is juxtaposed to a layer of material selected from the group consisting of a rubber and a plastic, said group member having the characteristics of being readily oriented and after orientation, shrinking at a lower temperature than the uncrosslinked biaxially oriented polyolefin film.

2. The method of claim 1 wherein the polyolefin is polyethylene.

3. The method of claim 1 wherein the polyolefin is polypropylene.

4. The method of biaxially orienting uncrosslinked polyethylene having a density of 0.92 and a melting point of 105° C. to form a heat shrinkable film which comprises heating said film at a temperature within 10° C. below and 20° C. above its melting point and thereafter expanding said film under gaseous pressure while said film is juxtaposed to a layer of material selected from the group consisting of a rubber and a plastic, said group member having the characteristics of being readily oriented and after orientation shrinking at a lower temperature than the uncrosslinked biaxially oriented polyethylene.

5. The method of biaxially orienting uncrosslinked polyethylene having a density of 0.96 and a melting point of 137° C. to form a heat shrinkable film which comprises heating said film at a temperature within 10° C. below and 20° C. above its melting point and thereafter expanding said film under gaseous pressure while said film is juxtaposed to a layer of material selected from the group consisting of a rubber and a plastic, said group member having the characteristics of being readily oriented and after orientation shrinking at a lower temperature than the uncrosslinked biaxially oriented polyethylene.

6. The method of biaxially orienting uncrosslinked polypropylene having a density of 0.89 and a melting point of 170° C. to form a heat shrinkable film which comprises heating said film at a temperature within 10° C. below and 20° C. above its melting point and thereafter biaxially orienting said film under gaseous pressure while said film is juxtaposed to a layer of material selected from the group consisting of a rubber and a plastic, said group member having the characteristics of being readily oriented and after orientation shrinking at a lower temperature than the uncrosslinked biaxially oriented polypropylene.

References Cited by the Examiner

UNITED STATES PATENTS

| | | | |
|---|---|---|---|
| 2,848,747 | 8/1958 | Dixon | 264—166 X |
| 2,952,867 | 9/1960 | Diedrich et al. | 264—98 |
| 3,140,004 | 7/1964 | Schaich | 215—1 |

ROBERT F. WHITE, *Primary Examiner.*

ALFRED L. LEAVITT, *Examiner.*

A. R. NOE, *Assistant Examiner.*